United States Patent [19]

Lüdke et al.

[11] 4,317,791

[45] Mar. 2, 1982

[54] PROCESS FOR THE PRODUCTION OF NON-CELLULAR MOLDED ARTICLES

[75] Inventors: Heimo Lüdke, Bergisch-Gladbach; Peter Günther, Odenthal; Helmut Kleimann, Leverkusen, all of Fed. Rep. of Germany

[73] Assignee: Bayer Aktiengesellschaft, Leverkusen, Fed. Rep. of Germany

[21] Appl. No.: 812,946

[22] Filed: Jul. 5, 1977

[30] Foreign Application Priority Data

Jul. 10, 1976 [DE] Fed. Rep. of Germany ....... 2631167

[51] Int. Cl.$^3$ .......................... B29C 5/00; C08G 18/08
[52] U.S. Cl. .................................... 264/297; 264/40.1; 264/150; 264/167; 264/240; 264/255; 521/902
[58] Field of Search ................ 260/77.5 NC; 264/297, 264/40.1, 255, 240, 167, 150; 521/902

[56] References Cited

U.S. PATENT DOCUMENTS

| T904,007 | 11/1972 | Garner | 264/255 |
|---|---|---|---|
| 2,212,334 | 8/1940 | Wallerich | 264/40.1 |
| 3,294,753 | 12/1966 | Beitchman et al. | 260/77.5 |
| 3,386,623 | 6/1968 | Berrill et al. | 222/134 |
| 3,437,722 | 4/1969 | Cronin et al. | 264/48 |
| 3,642,175 | 2/1972 | Robbins | 222/135 |
| 3,645,975 | 2/1972 | Bernstein | 260/75 NE |
| 3,697,485 | 10/1972 | Rambosek et al. | 260/77.5 NC |
| 3,711,444 | 1/1973 | Allen et al. | 260/77.5 NC |
| 3,711,589 | 1/1973 | Nye et al. | 264/255 |
| 3,736,298 | 5/1973 | Schmit et al. | 260/77.5 NC |
| 3,849,349 | 11/1974 | Frisch et al. | 260/77.5 NC |
| 3,963,680 | 6/1976 | O'Keefe et al. | 260/77.5 NC |
| 3,981,951 | 9/1976 | Richman | 264/171 |
| 3,984,510 | 10/1976 | Chandria et al. | 264/40.1 |

OTHER PUBLICATIONS

BiKales, *Molding of Plastics* (Encyclopedia Reprints) Wiley–Interscience (N.Y.) 1971, pp. 188, 192–194.
DOS 2,014,899–ICI, Jan. 16, 1970.

*Primary Examiner*—H. S. Cockeram
*Attorney, Agent, or Firm*—Gene Harsh; Joseph C. Gil

[57] ABSTRACT

A process is described for the successive production of at least two non-cellular molded articles differing in their mechanical properties. Both articles are based on organic polyisocyanates which are trimerized in the presence of compounds which are reactive with isocyanate groups where the equivalent ratio of NCO groups to groups reactive with NCO groups is varied within the range of 1:0.8 to 1:0. In a second embodiment, a uniform article is produced having anisotropic mechanical characteristics varying continuously and/or stepwise.

3 Claims, No Drawings

PROCESS FOR THE PRODUCTION OF NON-CELLULAR MOLDED ARTICLES

BACKGROUND OF THE INVENTION

According to German Offenlegungsschrift No. 2,031,292, it is known to produce non-cellular, homogeneous molded polyurethane articles by reacting an organic polyisocyanate with an approximately stoichiometric quantity of an organic polyhydroxyl compound. The reaction mixture should be substantially anhydrous and should not contain more than a small amount of compounds which liberate carbon dioxide in their reactions with the polyisocyanate. It is also known from the said prior publication that the molded polyurethane articles can be obtained as either soft elastic or hard products by suitable choice of the polyhydroxyl compounds and/or polyisocyanates.

One disadvantage of this process is that the non-cellular molded products must be left inside the mold for up to 45 minutes at temperature of about 100° C. to complete the chemical reaction by a heat treatment.

One fundamentally new method of obtaining non-cellular, unfoamed molded articles based on polyisocyanates has been indicated in an earlier application by one of the present applicants, U.S. Ser. No. 709,840. According to the process described in this earlier application, non-cellular molded articles can be produced in very short operating cycles. In contrast to the prior art processes mentioned above, a larger than stoichiometric quantity of isocyanate is used and, at the same time, additives which effect trimerization of the isocyanate groups present in excess of the stoichiometric quantity are included. Outstanding physical and thermal resin properties are obtained by adjusting particular combinations of starting materials so that they contain the isocyanate groups and groups which are reactive with isocyanate groups in particular equivalent proportions to each other. Different properties and qualities can only be obtained by using different combinations of starting materials and adjusting them to the optimum equivalent proportions.

DESCRIPTION OF THE INVENTION

It has now been found that, using the process according to the above mentioned earlier application as a basis, the mechanical properties, in particular the elasticity of the molded articles, can easily be adjusted within the wide range from soft elastic to rigid hard without altering the nature of the starting materials. This is accomplished by varying the equivalent proportions of isocyanate groups to groups which are reactive with isocyanate groups within the range of 1:0.8 to 1:0. When operating on this principle, it is possible to produce successive homogeneous molded articles which differ from each other in their mechanical characteristics, i.e. in particular their hardness or elasticity, simply by altering the proportion of polyisocyanates to compounds having groups which are reactive with isocyanate groups before the reaction mixture is introduced into the mold, i.e. by adjusting the reaction mixture to a different equivalent proportion than that used for the previously produced molded articles. It is not necessary to alter the nature of the starting components nor is it necessary to clean the mixing apparatus when changing over from one kind of product to another, for example from semi-rigid to rigid molded articles.

By employing the principle on which the present invention is based, it is also possible to produce unfoamed, non-cellular molded articles which form a unit but are mechanically inhomogeneous, i.e. they vary continuously and/or stepwise in their mechanical characteristics, i.e. in particular their hardness or elasticity. This result can be obtained simply by continuously and/or stepwise varying the equivalent proportion of isocyanate groups to groups which are reactive with isocyanate groups during the operation of filling the mold.

A first embodiment of the present invention thus relates to a process for the successive production of at least two non-cellular molded articles based on organic polyisocyanates but differing from each other in their mechanical characteristics. In this process, organic polyisocyanates are subjected to a polymerization reaction in closed molds in the presence of compounds which effect trimerization of isocyanate groups, optionally in the presence of organic compounds having groups which are reactive with isocyanate groups, provided always that the equivalent proportion of isocyanate groups to groups which are reactive with isocyanate groups is at least 1:0.8, and optionally in the presence of other auxiliary agents and additives but in the absence of blowing agents, and in cases where compounds having groups which are reactive with isocyanate groups are also present, as indicated above, the organic polyisocyanates are in addition subjected to an isocyanate addition reaction. This process is characterized in that the mechanical properties of the molded articles are altered simply by varying the equivalent proportion of isocyanate groups to groups which are reactive with isocyanate groups within the range of 1:0.8 to 1:0 in the reaction mixture introduced into the mold.

A second embodiment of the present invention also relates to a process for the production of uniform, non-cellular molded articles based on organic polyisocyanates, which articles have anisotropic mechanical characteristics varying continuously and/or stepwise, in which process organic polyisocyanates are subjected to a polymerization reaction inside closed molds in the presence of compounds effecting the trimerization of isocyanate groups, optionally in the presence of organic compounds having groups which are reactive with isocyanate groups, but always on condition that the equivalent ratio of isocyanate groups to groups which are reactive with isocyanate groups is at least 1:0.8, and optionally in the presence of other auxiliary agents and additives but in the absence of blowing agents and, in cases where compounds having groups are present, the organic polyisocyanates are at the same time subjected to an isocyanate addition reaction, characterized in that for producing the molded articles having anisotropic mechanical characteristics which vary continuously and/or stepwise, the equivalent ratio of isocyanate groups to groups which are reactive with isocyanates is varied continuously and/or stepwise within the range of 1:0.8 to 1:0 in the reaction mixture during its introduction into the mold.

Lastly, the present invention relates to non-cellular molded articles forming a unit and containing urethane and isocyanurate groups, characterized by the fact that they have anisotropic mechanical characteristics which vary continuously and/or stepwise.

According to the invention, the polyisocyanate component is always introduced into a closed mold as a mixture with compounds which effect trimerization of the isocyanate groups, optionally in combination with compounds having groups which are reactive with isocyanate groups, optionally together with other additives commonly used in isocyanate chemistry such as, for example, catalysts (for accelerating the isocyanate addition reaction), stabilizers, flame retarding agents, fillers, mold release agents or dehydrating agents, and in the absence of blowing agents, the mixture then reacting inside the mold to produce the molded article. Since the articles produced according to the invention are non-cellular, i.e. not foamed, it is, of course, necessary to exclude both water and organic blowing agents. However, elaborate methods of removing traces of moisture which are liable to be present, for example in commercial polyhydroxyl compounds, in particular in polyhydroxypolyesters and polyhydroxypolyethers, are generally unnecessary. These traces of moisture do not generally act as blowing agents because of the small quantity in which they are present and their reaction with isocyanate groups can be suppressed. Preparation of the reaction mixture may be carried out by any of the dosing and mixing methods commonly employed in multicomponent and polyurethane processes, for example those described in Vieweg and Hochtlen: Polyurethane, Kunststoff Handbuch Vol. VII, Carl Hanser-Verlag, Munich 1966 or in Piechota/Rohr: Integralschaumstoffe, Carl Hanser-Verlag, Munich, Vienna 1975.

When two or more starting materials containing isocyanate groups or starting materials containing groups which are reactive with isocyanate groups are used, all the components necessary for the reaction mixture may be mixed together either in a single mixing operation or in two or more mixing operations separated from each other in time and/or space.

The variation in equivalent proportions of reactants which are kept constant in their nature (polyisocyanate components and component containing groups which are reactive with isocyanate groups), which is an essential feature of the invention, may be carried out as follows: If it is intended to vary the mechanical characteristics of successive homogeneous molded articles produced (first embodiment), the quantity of isocyanate component used for a constant quantity of component having groups which are reactive with isocyanate groups or the quantity of latter components used for a constant quantity of isocyanate component is varied before the reaction mixture is introduced into the molds. If, on the other hand, it is intended to produce molded articles which are anisotropic in their mechanical characteristics (second embodiment), the said variation in the quantity of reactants is carried out continuously and/or stepwise during introduction of the reaction mixture into the mold.

When using two or more products containing isocyanate groups and differing from each other in their isocyanate group content or when using two or more products containing groups which are reactive with isocyanate groups and differing in the amount of such groups contained in them, variation in the equivalent proportions may also be carried out by altering only the proportions within the mixture of products containing isocyanate groups or within the mixture of compounds containing groups which are reactive with isocyanate groups.

According to the invention, the equivalent ratio of isocyanate groups to groups which are reactive with isocyanate groups is always between 1:0.8 and 1:0 and preferably between 1:0.6 and 1:0.01. In both embodiments according to the invention, it is in principle possible to operate from time to time without using compounds containing groups which are reactive with isocyanate groups (equivalent ratio = 1:0). Since the hardness of the molded article increases with increasing equivalent ratio of isocyanate groups to groups which are reactive with isocyanate groups for a given choice of reactants the equivalent ratio of 1:0 represents a limiting value at which a hard non-cellular chemical product is obtained by polymerization (trimerization) of the isocyanate groups of the polyisocyanate component alone. This product still has good properties as a solid material, however. In both embodiments according to the invention, the variation in equivalent proportions may be carried out as desired, i.e. in both directions. In the first embodiment, for example, it is possible in the extreme case first to produce a batch of hard molded products from a given selection of components by leaving out the compounds which contain groups capable of reacting with isocyanate groups (equivalent ratio 1:0). A second batch of homogeneous, elastic products can then be produced by adding a polyol component to the same polyisocyanate component before its introduction into the molds using an NCO/OH equivalent ratio of 1:0.8. The sequence could, of course, be reversed. Less extreme variations in the elastic properties of the molded articles could be obtained by reducing the variation of the NCO/OH equivalent ratio in one direction or another. In the second embodiment according to the invention the variation in equivalent ratio may also be carried out in both directions, either stepwise or continuously. In this way it would be possible, for example, to manufacture a broomstick which is hard at both ends and elastic in the middle by first filling say 10% of the mold with a mixture containing a preselected polyisocyanate component, maintaining the NCO/OH equivalent ratio at 1:0.01, for example, and then lowering the equivalent ratio continuously or stepwise to 1:0.6 until say 30% of the mold has been filled and then finally increasing the equivalent ratio to 1:0.01 while completing the process of filling the mold.

The rigidity or elasticity of the molded articles obtainable according to the invention depends on the cross-linking density of the polyurethane-polyisocyanurate structure. The rigidity therefore always increases with increasing equivalent ratio of isocyanate groups to groups which are reactive with isocyanate groups, as already mentioned above. The concentration of isocyanate groups, which have a cross-linking action, always increases with their equivalent ratio. However, the concentration of structural units which have a cross-linking action can in addition be varied by suitable choice of the functionality and/or molecular weight of the other reactant used. It will readily be understood that in particular the functionality and the molecular weight of the component which contains groups capable of reacting with isocyanate groups will also help to determine the elasticity of the molded articles. For a given NCO/OH equivalent ratio, the elasticity of the molded articles produced therefore increases with decreasing functionality and increasing molecular weight of the component containing groups which are reactive with isocyanate groups. This means that the range of elasticity which can be obtained within the limits set by the invention of the equivalent ratios of isocyanate groups to groups which are reactive with isocyanate groups can be determined by suitable choice of the reactants and in particular of the component which contains groups capable of reacting with isocyanate groups.

The molded products obtained by the process according to the invention can be removed from the mold after a very short time and are ready for use without requiring time consuming finishing operations.

The molds used according to the invention are preferably made of a material having a high thermal capacity and high thermal conductivity, preferably a metal, but the molds may also be made of other materials, for example synthetic resins such as polyepoxides or polyester resins or polyurethanes or also coated wood, glass or concrete. It is often advantageous, to maintain the surface of the mold at a constant temperature by means of air or a liquid, preferably water or an oil. The temperature of the surface of the mold is generally kept at 50° to 90° C.

The isocyanates used in the process of the present invention may be any of the organic polyisocyanates commonly used in polyurethane chemistry, e.g. tetramethylene diisocyanate; hexamethylene diisocyanate; m-xylylene diisocyanate; p-xylylene diisocyanate; 4,4'-dimethyl-1,3-xylylene diisocyanate; cyclohexane-1,4-diisocyanate; dicyclohexylmethane-4,4'-diisocyanate; m-phenylene diisocyanate; p-phenylene diisocyanate; 1-alkylbenzene-2,4- and 2,6-diisocyanates such as tolylene-2,4- and -2,6-diisocyanate, 3-($\alpha$-isocyanatoethyl)-phenyl isocyanate; 1-benzylbenzene-2,6-diisocyanate; 2,6-diethylbenzene-1,4-diisocyanate; diphenylmethane-4,4'-diisocyanate; 3,3'-dimethoxydiphenylmethane-4,4'-diisocyanate or naphthylene-1,5-diisocyanate. Trifunctional and higher functional polyisocyanates may also be used, e.g. toluene-2,4,6-triisocyanate or mixtures of polymethylene and polyphenyl polyisocyanates obtained by aniline formaldehyde condensation followed by phosgenation. Isocyanates containing carbodiimide groups, uretdione groups, uretone imine groups or isocyanurate groups may also be used. Mixtures of the above mentioned isocyanates are also suitable. Reaction products of polyvalent alcohols with polyvalent isocyanates or polyisocyanates of the kind used according to German Pat. No. 1,022,789 and No. 1,027,394 for example, may also be used.

The polyisocyanates used in the process according to the invention are preferably diphenylmethane diisocyanates containing carbodiimide and/or uretone imine groups, which can be obtained according to U.S. Pat. No. 3,152,162, or polyisocyanates having urethane groups, which can be obtained by reacting 1 mol of 4,4'-diisocyanatodiphenylmethane with 0.05 to 0.3 mol of low molecular weight diols or triols, preferably with polypropylene glycols having a molecular weight below 700, 2,4-diisocyanatotoluene optionally in combination with 2,6-diisocyanatotoluene, and liquid polyisocyanate mixtures obtainable in known manner by the phosgenation of aniline formaldehyde condensates. Mixtures of these preferred polyisocyanates are also preferred.

The process according to the invention is carried out in the presence of compounds having groups reactive with isocyanate groups except in the extreme case mentioned above. Suitable compounds of this kind are in particular any alcoholic hydroxyl compounds within a molecular weight range of 32 to 4000 which may contain ether and/or ester groups, i.e. low molecular weight or also higher molecular weight monohydric or dihydric alcohols or mixtures of such compounds.

When the compounds containing groups which are reactive with isocyanate groups consist exclusively of monohydric alcohols, it is necessary to take into account that these alcohols have a chain breaking effect due to their monofunctionality so that the NCO/OH equivalent ratio should in that case be higher than 1:0.5. The preferred compounds having groups which are reactive with isocyanate groups are the polyhydroxyl compounds with molecular weights of 62 to 4000 which are known per se from polyurethane chemistry.

Suitable monohydric alcohols include e.g. methanol, ethanol, n-butanol, n-dodecanol, n-octadecanol, isopropanol, secondary butanol and cyclohexanol as well as alkoxylation products of such monohydric alcohols i.e. in particular polyether alcohols obtained by ethoxylation and/or propoxylation of such alcohols. Monohydric alcohols containing ester groups may also be used for the process according to the invention, e.g. ethylene glycol monoacetate.

The polyhydroxyl compounds used may be either low molecular weight polyols (molecular weight 62 to 400) such as ethylene glycol, diethylene glycol, butane-1,4-diol, butyne-1,4-diol, hexane-1,6-diol, octane-1,8-diol, trimethylolpropane, glycerol, pentaerythritol, sorbitol or saccharose or higher molecular weight polyhydroxyl compounds, in particular polyhydroxypolyethers or polyhydroxypolyesters having molecular weights within the range of 400 to 4000. Polyhydroxypolyethers of this kind may be prepared by chemical addition of alkylene oxides such as ethylene oxide, propylene oxide, butylene oxide or styrene oxide to compounds with active hydrogen atoms which serve as starting media. Compounds which may be used as starting media include, e.g. water, polyols such as ethylene glycol, propylene glycol, butylene glycol, trimethylolpropane or glycerol, amines such as ammonia, ethylene diamine, hexamethylene diamine, 4,4'-diamino-diphenylmethane, 2,4'-diaminodiphenylmethane, 2,4-diaminotoluene, 2,6-diaminotoluene or aniline, aminoalcohols such as aminoethanol, diethanolamine or triethanolamine, polyphenols such as hydroquinone, 4,4'-dihydroxydiphenyl methane, 2,2-bis-(4-hydroxyphenyl)-propane and similar derivatives of such compounds. The alkylene oxides may also undergo chemical addition as mixtures, in which case the alkylene oxide residues may be obtained in the adduct in the form of blocks or in an alternating arrangement. the polyethers used according to the invention may contain secondary or primary hydroxyl groups. It is frequently preferred to use polyethers which carry primary hydroxyl end groups. Furthermore, it is frequently preferred to use polyethers which have a hydroxyl group content of from 0.5 to 18%. Polyesters such as can be obtained, for example, by reaction of the above mentioned poly alcohols with polyfunctional carboxylic acids are also suitable. The polyfunctional carboxylic acids may be, for example, phthalic acid, terephthalic acid, succinic acid, adipic acid, octane-1,8-dicarboxylic acid or maleic acid. Polyesters having amide groups such as can be obtained by means of aminoalcohols, diamines or aminocarboxylic acids may also be included. Polycaprolactones may also be used. Other compounds which may also be incorporated include polyesters or polyester amides having double or triple bonds or modifying groups of unsaturated or saturated fatty acid alcohols, unsaturated monomers which can be polymerized by radical or ionic polymerization, and epoxides.

Thioethers containing hydroxyl and/or mercapto groups and compounds which contain carboxyl groups and/or cyclic anhydride groups and may in addition have ether, ester, amide, urea, urethane or ether groups may also be used.

Primary and/or secondary amines such as aniline, 1,4-diaminobenzene, cyclohexylene diamine or 3,3'-dichloro-4,4'-diaminodiphenylmethane may also be used as compounds having groups which are reactive with isocyanate groups.

Any mixtures of the compounds mentioned above as examples of compounds containing groups which are reactive with isocyanate groups may be used according to the invention.

The reaction mixtures used according to the invention always contain compounds which effect trimerization of isocyanate groups. Catalysts of this kind have been mentioned, for example, in Saunders-Frisch, Polyurethanes, Part 1, Interscience Publishers, 1962, on pages 94 and 95, in Organic Chemistry, A Series of Monographs, Volume 9 (Cycloaddition reactions of hetero-cumulenes) by Henri Ulrich, Academic Press, New York, London, 1967, e.g. on pages 128 to 133, and in Kunststoff Handbuch, Volume 7, by R. Vieweg and A. Hochtlen, Carl Hanser-Verlag, Munich 1966, e.g. on page 17. The preferred catalysts are, for example, those which effect gelling of the isocyanate with isocyanurate formation within 10 minutes at a temperature of 20° C. when used, for example, in a quantity of from 1 to 10 g of catalyst per 100 g of aromatic polyisocyanate. Catalysts of this kind include e.g. alkali metal acetates such as sodium and potassium acetate; alkali metal phenolates such as sodium phenolate; sodium trichlorophenolate and, preferably, 2,4,6-tris-(dimethylaminomethyl)-phenol or a mixture of o- and p-dimethylaminomethylphenol and alkali metal and alkaline earth metal oxides. Lead naphthenate, potassium oleate, lead benzoate and lead octoate may also be used as catalysts.

Catalysts suitable for the process according to the invention have also been described in German Pat. No. 1,203,792; British Pat. No. 1,001,746; French Pat. No. 1,387,777; U.S. Pat. No. 2,977,360; German Auslegeschrift No. 1,146,889; German Pat. No. 1,174,790; French Pat. No. 1,343,812; U.S. Pat. Nos. 3,154,522; 3,179,626; and 3,217,003; Japanese Patent publication Sho- No. 85838/65; British Pat. Nos. 821,158; 927,173; and 837,120 and in Ind. Eng. Chem. Prod. Development, 5 (1966), No. 1, pages 35–41.

Basic compounds which contain at least two aromatic nuclei in the molecule and at least one aromatically bound tertiary amine function may also be used as catalysts according to the invention. Mannich bases of diethylamine, formaldehyde and phenols of the kind containing in the molecule at least one organic substituent having at least 6 carbon atoms may also be used as catalysts. Mannich bases of phenols which can be built into the molecule and which in addition to the substituted aminomethyl group and phenolic hydroxyl group contain at least one other group having hydrogen atoms which are reactive with isocyanates may also be used.

The quantity of trimerization catalysts to be used according to the invention is generally between 0.01 and 10% by weight, preferably between 0.1 and 2.0% by weight, based on the polyisocyanate component.

In addition to the above mentioned starting materials and additives used according to the invention, the usual additives used in polyurethane chemistry may also be included, e.g. activators which accelerate the isocyanate addition reaction, stabilizers and emulsifiers such as UV light stabilizers or substances which prevent separation of immiscible or difficulty miscible reactants, flame-retarding agents, fillers, mold release agents, dehydrating additives and plasticizers.

Suitable activators for accelerating the isocyanate polyaddition reaction include e.g. dimethylbenzylamine; N-methyl-N'-(N,N-dimethylaminoethyl)-piperazine; triethylene amine; permethylated diethylene triamine and organic tin compounds such as dibutyl tin dilaurate or tin-(II) octoate.

Examples of suitable stabilizers for improving the compatibility between individual components include the polyether polysiloxanes known per se in the chemistry of polyurethane foams and sulphonated castor oils and their alkali metal salts.

The mold release agents used may be any internal mold release agents known per se which are recommended for the manufacture of molded foam products and have been described, for example, in German Offenlegungsschriften Nos. 1,953,637; 2,121,670 and 2,356,692. So-called self-releasing polyisocyanates which have been modified with suitable additives may, of course, also be used. These have been described in German Offenlegungsschrift No. 2,307,589. Mold release agents of the kind described in German Offenlegungsschriften Nos. 2,319,648; 2,363,452; 2,356,692 and 2,431,968 may also be used according to the invention.

Suitable water absorbing substances include both compounds which are highly reactive with water, such as tris(chloroethyl)-orthoformate, and the water binding fillers described by way of example below.

Suitable plasticizers include e.g. compounds such as organic phosphates, phosphites or phosphonates, sulphonates, sulphones, linear or cyclic saturated or unsaturated or also aromatic hydrocarbons, halogenated hydrocarbons, linear or cyclic ethers, esters, polyethers or polyesters, organic carbonates and polycarbonyl compounds.

The specific strength of the molded articles produced according to the invention can be substantially increased by adding fillers to the reaction mixture. These fillers may be either organic or inorganic. The increase in specific strength is particularly marked when fillers having a flat or fibrous structure are used, e.g. glass fibers, asbestos powders, asbestos fibers, metal powders, metal fibers or synthetic fibers. Among the organic fillers, which may be used in the form of powders and/or as emulsions, for example, both duroplastic and, particularly, thermoplastic materials may be used. The following are mentioned as examples: Homopolymers and copolymers of mono-unsaturated or multi-unsaturated olefines; acrylonitrile; unsaturated carboxylic acid esters; styrene; vinyl chloride and vinylidene chloride. Cellulose derivatives; polyamides; polyimides; polycarbonates; polyoxymethylenes and carbon fibers may also be used as fillers in the sense defined above. It is advantageous to use fillers which have water binding properties, e.g. alkaline earth metal oxides, zeolites, aluminum oxides or silicates.

For practical application of the molded articles according to the invention, it is frequently advantageous to provide them with an additional reinforcement either locally or over their whole surface, for the purpose of strengthening the elements, for introducing localized forces or increasing the rigidity of the molded articles. Such reinforcement may advantageously be obtained, for example, by placing three-dimensional systems of metal, plastics or plywood which can easily be permeated with reaction mixture into the mold before the filling process. The materials used for these three-dimensional reinforcements through which the reaction mixture can easily flow and to which the reaction mixture will adhere sufficiently firmly for practical purposes include, for example, metal mesh, honeycomb materials, non-woven fiber webs which have been three-dimensionally stitched or tacked or fixed with synthetic binder, and woven, knitted or braided fibrous fabrics. Reinforcements of this kind arranged in the mold before introduction of the reaction mixture remain in the desired position and hence ensure the desired localized or overall reinforcing effect. Reinforcements made of materials such as metal, plastics or plywood, for example, which are spread out over a comparatively wide area and project into the molded product are particularly effective for introducing additional strength in localized areas, and again they are carefully fixed in the mold which is to be filled with reaction mixture.

The molded products obtainable according to the invention may be used in various fields of application, for example in the furniture industry as doors, furniture bodies, flaps, drawers and drawer shutters, fittings, hinges, handles and knobs; in the building industry as window frames and sashes, windowpanes, complete skylights, door and window handles, glass tiles, water pipes and waste pipes, fittings, handles and handwheels for heating radiators, letterboxes, ventilators, telephone booths, cable sleeves, gullies, hydrant lids or sheeting boards; in the motor vehicle industry as air filter housings, water pumps, ventilators and housings, ignition distributors, heatings and housings, seat frames and panels; for internal fittings, armature housings and panels, dashboard foundations, steering wheel covers, brackets, doors, hoods, luggage racks, buffers, glove compartments and flaps, hat racks, door handles and locking knobs, windowcranks, rear doors with windows, mudguards, headlight units, flashlight and rear light units including glass, town car bodies, spare wheels and hub caps.

Many of these products given as examples are used in road and rail vehicles and in aircraft and watercraft. The following products are used in the electrical industry; switch covers and housings, control knobs, telephone housings, pallettes for printed circuits, current distributor boxes and cupboards, insulators, instrument switches and plugs, lamps and light fittings and battery boxes; in the phonographic industry; loudspeaker boxes, record player housings, radio and television housings, housing and frames for automatic musical instruments, control knobs.

The following are examples of technical apparatus: Housings for drilling machines, tool boxes, pump housings, pump wheels, safety helmets, office machine housings and chassis, cable drums, filter holders, track wheels and rollers, housings and chassis for cameras and projectors, tool handles. The following are examples of articles for domestic use: Coat hangers, fork handles, suitcases and suitcase handles, housings for kitchen machinery, scales, sewing machines, handles for irons, frying pan handles, pot lids, pot lid handles, buckets and refuse bins, boxes and tins. The following are examples of bathroom fittings: Lavatory seats, bathroom cabinets, soap dishes, shelves, towel rails, walls for shower cabinets, brush handles and brush backs. The following are examples of manufacturing products for sports and games: Slot machine games, bowling pins and balls, go-carts, wheelbarrows, toy trains, rolls for roller skates, fittings and accessories for sailing boats such as cleats, blocks, winch handles, position lights, bullseyes, accessories for rowing boats and paddle boats such as rowlocks, sliding seats and their wheels, minigolf clubs, balls and obstacles, goal posts for competition ski runs and canoeing.

The main advantage of the process according to the invention is that it, for the first time, makes it possible for non-cellular molded articles based on polyisocyanates and compounds having groups which are reactive with isocyanates to be produced with almost any desired properties, simply by adjusting the equivalent ratio. The molded products produced according to the invention can be removed from the mold after a short time (10 to 150 seconds after filling of the mold). This is extremely surprising in view of the fact that both the process according to German Offenlegungsschrift No. 2,031,292 for the production of non-cellular molded articles and the process according to German Offenlegungsschrift No. 1,794,117 for the production of molded foam products require much longer times in the mold.

The examples which follow serve to explain the invention in more detail.

General method of production of the mold articles:

Components A and B given in the specific Examples are dosed in a mixing vessel by means of a two-component dosing mixing apparatus or by weighing the components into the vessel in the required proportions by weight, and they are vigorously and carefully mixed so that as far as possible no air bubbles are stirred into the reaction mixture. The mixture is then introduced into a closed mold. Preparation of the reaction mixture is preferably carried out at room temperature and the temperature of the mold is preferably maintained at about 50° to 90° C. and preferably kept constant throughout the manufacturing process. The molded articles removed from the mold after the given, brief molding time are sufficiently hardened and resistant to plastic deformation. They can be used or tested immediately after cooling.

EXAMPLES

EXAMPLE 1 (1st embodiment)

Component A:

100 parts by weight of a polyether obtained by chemical addition of 83% of propylene oxide and 17% of ethylene oxide to trimethylolpropane (hydroxyl number 36); 0.6 parts by weight of potassium acetate dissolved in 1.7 parts by weight of diethylene glycol.

Component B:

50 to 250 parts by weight of polyisocyanate containing urethane groups and prepared by modification of a phosgenation product of an aniline-formaldehyde condensate containing about 79% by weight of diisocyanatodiphenyl methane with 3% by weight of tripropylene glycol, based on the quantity of polyisocyanate mixture which is required to be modified. Viscosity of the modified polyisocyanate mixture at 25° C.: 90 mPa s; isocyanate content: 28%.

Components A and B are mixed in proportions by weight of 100:50 (corresponding to an NCO/OH equivalent ratio of 1:0.18) in a two-component dosing and mixing apparatus and then immediately introduced into a heatable aluminum mold measuring 40×40×1 cm. When the mold has been filled, a second, similar mold is filled with a mixture of the same reactants but in proportions by weight of A:B equal to 100:100 (corresponding to an NCO/OH equivalent ratio of 1:0.09) to produce a second molded article.

Another three similar molds are filled in completely analogous manner, using proportions by weight of A:B as 100:150, 100:200 and 100:250 (corresponding to NCO/OH equivalent ratios of 1:0.06; 1:0.045 and 1:0.036). The product is in each case removed from the mold after 15 seconds. The mechanical properties of the successive molded articles obtained are summarized in the table below:

| Component A Parts by weight | Component B Parts by weight | Flexural strength (MPa) | Elongation at break (%) | E-modulus (MPa) | Heat resistance according to DIN 53424 (°C.) |
| --- | --- | --- | --- | --- | --- |
| 100 | 50 | 7.8 | 24 | 116 | 130 |
| 100 | 100 | 29.9 | 23 | 515 | 190 |
| 100 | 150 | 54.7 | 10.7 | 944 | 195 |
| 100 | 200 | 66.9 | 7.7 | 1180 | 200 |
| 100 | 250 | 75.0 | 4 | 1560 | 246 |

The densities of the molded articles, given in the same sequence, are: 1.11, 1.14, 1.15, 1.16 and 1.18 g/cm$^3$.

EXAMPLE 2 (2nd embodiment)

Component A:

90 Parts by weight of a polyether obtained by chemical addition of 87% of propylene oxide and 13% of ethylene oxide to propylene glycol (hydroxyl number 28); 10 parts by weight of a polyether obtained by chemical addition of ethylene oxide to trimethylolpropane (hydroxyl number 550) and 0.8 parts by weight of sodium acetate dissolved in 3.2 parts by weight of ethylene glycol.

Component B:

80–260 Parts by weight of a semiprepolymer obtained by reaction of 5 mols of 4,4'-diisocyanatodiphenylmethane with 1 mol of tripropylene glycol. Isocyanate content 24%.

The dosing and delivery apparatus used was a high pressure piston pump in which the delivery output was reduced during delivery of component B from a ratio by weight of 260 to a ratio by weight of 80 (based on 100 parts by weight of component A).

The mold was a closed steel tube (diameter 50 mm, height 90 cm) which could be thermally controlled and which was subdivided into several segments to facilitate removal of the finished product. It was designed to be filled from above. At the beginning of the filling process, components A and B were introduced in a ratio by weight of 100:260 (corresponding to an isocyanate/hydroxyl equivalent ratio of 1:0.10) for ½ second, and the ratio by weight was then varied in a linear relationship from 100:260 to 100:80 (corresponding to an isocyanate/hydroxyl equivalent ratio of 1:0.32) over the next two seconds, and finally during the last ½ second of the total filling process which extended over a period of 3 seconds, a mixture of A and B in which the ratio by weight was kept constant at 100:80 was introduced.

The rod shaped molded product was removed after 15 seconds. The solid properties varied continuously in the longitudinal direction. The values for the Shore D hardness of the surface are given by way of example. The longitudinal dimensions were measured from the lower end of the rod produced in the vertical tube. The results are summarized in the following Table.

| Measuring point | Dimensions of rod | Shore D hardness |
| --- | --- | --- |
| 1st measuring range | 0 - about 15 cm | 85 |
| 2nd measuring point | 30 cm | 81 |
| 3rd measuring point | 45 cm | 75 |
| 4th measuring point | 60 cm | 66 |
| 5th measuring range | 75 - about 90 cm | 42 |

What is claimed is:

1. A process for the successive production of at least two non-cellular molded articles differing in their mechanical characteristics and both of which are based on organic polyisocyanates, wherein organic polyisocyanates are subjected to a polymerization reaction in closed molds in the presence of compounds effecting the trimerization of isocyanate groups, optionally in the presence of organic compounds having groups which are reactive with isocyanate groups but always provided that the equivalent ratio of isocyanate groups to groups which are reactive with isocyanate groups is at least 1:0.8, and optionally in the presence of other auxiliary agents and additives but in the absence of blowing agents, and in cases where compounds having groups which are reactive with isocyanate groups are present, said organic polyisocyanates may at the same time be subjected to an isocyanate addition reaction, characterized in that alteration of the mechanical properties of the molded articles is achieved simply by varying the equivalent ratio of isocyanate groups to groups which are reactive with isocyanate groups within the range of 1:0.8 to 1:0 in the reaction mixture which is to be introduced into the mold.

2. A process for the production of a uniform non-cellular molded article having inhomogeneous mechanical characteristics varying continuously and/or stepwise in said article, based on organic polyisocyanates, wherein organic polyisocyanates are subjected to a polymerization reaction in closed molds in the presence of compounds which effect trimerization of isocyanate groups, optionally in the presence of organic compounds having groups which are reactive with isocyanate groups but always provided that the equivalent ratio of isocyanate groups to groups which are reactive with isocyanate groups is at least 1:0.8, and optionally in the presence of other auxiliary agents and additives but in the absence of blowing agents, and in cases where compounds having groups which are reactive with isocyanate groups are present, said organic polyisocyanates may at the same time be subjected to an isocyanate addition reaction, characterized in that for obtaining the inhomogeneous mechanical characteristics which vary continuously and/or stepwise in the molded article, the equivalent ratio of isocyanate groups to groups which are reactive with isocyanate groups in the reaction mixture which is to be introduced into the mold is varied continuously and/or stepwise within the range of 1:0.8 to 1:0 during the operation of filling the mold.

3. The product of the process of claim 2.

* * * * *